United States Patent
Zhao

(10) Patent No.: US 9,939,669 B2
(45) Date of Patent: Apr. 10, 2018

(54) FLEXIBLE DISPLAY PANEL AND FLEXIBLE DISPLAY

(71) Applicant: BOE TECHNOLOGY GROUP CO., LTD., Beijing (CN)

(72) Inventor: Weili Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 384 days.

(21) Appl. No.: 14/436,488

(22) PCT Filed: Oct. 21, 2014

(86) PCT No.: PCT/CN2014/089029
§ 371 (c)(1),
(2) Date: Apr. 17, 2015

(87) PCT Pub. No.: WO2015/158123
PCT Pub. Date: Oct. 22, 2015

(65) Prior Publication Data
US 2016/0259199 A1    Sep. 8, 2016

(30) Foreign Application Priority Data

Apr. 14, 2014  (CN) .......................... 2014 1 0148671

(51) Int. Cl.
*G02F 1/1335* (2006.01)
*G02F 1/1333* (2006.01)
(Continued)

(52) U.S. Cl.
CPC ...... *G02F 1/133305* (2013.01); *G02F 1/1336* (2013.01); *G02F 1/13363* (2013.01);
(Continued)

(58) Field of Classification Search
CPC .......... G02F 2001/13793; G02F 2001/133616; G02F 1/133305; G02F 1/134363
See application file for complete search history.

(56) References Cited

U.S. PATENT DOCUMENTS

| 4,793,691 A * | 12/1988 | Enomoto | ............... C09K 19/60 |
| | | | 349/106 |
| 2002/0021388 A1* | 2/2002 | Nakamura | ............. G02B 5/201 |
| | | | 349/106 |

(Continued)

FOREIGN PATENT DOCUMENTS

| CN | 101813842 A | 8/2010 |
| CN | 101910923 A | 12/2010 |

(Continued)

OTHER PUBLICATIONS

Chinese Office Action dated Dec. 17, 2014 issued in corresponding Chinese Application No. 201410148671.2.

(Continued)

*Primary Examiner* — Thanh-Nhan P Nguyen
(74) *Attorney, Agent, or Firm* — Nath, Goldberg & Meyer; Joshua B. Goldberg; Annie Kock

(57) ABSTRACT

A flexible display panel, comprising: a first flexible substrate and a second flexible substrate cell-aligned to each other; a blue phase liquid crystal layer disposed between the first flexible substrate and the second flexible substrate and strip electrodes arranged on the second flexible substrate at a side close to the blue phase liquid crystal layer at intervals; a reflective layer disposed on the second flexible substrate at a side far away from the blue phase liquid crystal layer; and a ¼ wave plate and a polarizer successively arranged on the first flexible substrate at a side far away from the blue phase liquid crystal layer, with an included angle between a light transmitting axis of the polarizer and an optical axis of the ¼ wave plate being 45° and an included angle between each of the strip electrodes and the optical axis of the ¼ wave plate being 90°.

12 Claims, 1 Drawing Sheet

(51) Int. Cl.
  *G02F 1/13363* (2006.01)
  *G02F 1/1343* (2006.01)
  *G02F 1/137* (2006.01)

(52) U.S. Cl.
  CPC .... *G02F 1/13439* (2013.01); *G02F 1/133308* (2013.01); *G02F 1/133371* (2013.01); *G02F 1/133514* (2013.01); *G02F 1/133528* (2013.01); *G02F 1/133553* (2013.01); *G02F 1/134309* (2013.01); *G02F 1/134363* (2013.01); *G02F 2001/13332* (2013.01); *G02F 2001/13793* (2013.01); *G02F 2001/133354* (2013.01); *G02F 2001/133616* (2013.01); *G02F 2001/133638* (2013.01)

(56) References Cited

U.S. PATENT DOCUMENTS

| | | | | |
|---|---|---|---|---|
| 2002/0047974 | A1* | 4/2002 | Matsumoto | G02F 1/134363 349/141 |
| 2004/0223094 | A1* | 11/2004 | Hamada | G02B 6/0051 349/63 |
| 2005/0219441 | A1* | 10/2005 | Stephenson, III | G02F 1/13718 349/86 |
| 2010/0053721 | A1* | 3/2010 | Chwu | G02F 1/133305 359/245 |
| 2010/0141185 | A1* | 6/2010 | Benning | A61C 17/221 318/139 |
| 2011/0170040 | A1* | 7/2011 | Park | G02F 1/13363 349/96 |

FOREIGN PATENT DOCUMENTS

| | | |
|---|---|---|
| CN | 101943829 A | 1/2011 |
| CN | 102087446 A | 6/2011 |
| CN | 20110076370 A | 7/2011 |
| CN | 102879957 A | 1/2013 |
| CN | 2013037093 A | 2/2013 |
| CN | 203773202 U | 8/2014 |

OTHER PUBLICATIONS

International Search Report dated Jan. 26, 2015 issued in corresponding International Application No. PCT/CN2014/089029.

\* cited by examiner

FLEXIBLE DISPLAY PANEL AND FLEXIBLE DISPLAY

This is a National Phase Application filed under 35 U.S.C. 371 as a national stage of PCT/CN2014/089029 filed on Oct. 21, 2014, an application claiming the benefit to Chinese application No. 2014/0148671.2 filed on Apr. 14, 2014; the content of each of which is hereby incorporated by reference in its entirety.

FIELD OF THE INVENTION

The present invention relates to the field of flexible display technology, in particular to a flexible display panel and a flexible display.

BACKGROUND OF THE INVENTION

At present, Liquid Crystal Displays (LCDs) have become mainstream display products in market due to their excellent performances and mature technologies.

As one key component in a liquid crystal display, a liquid crystal panel is mainly formed by cell alignment of a color filter substrate and an array substrate, and liquid crystal is filled between the color filter substrate and the array substrate to form a liquid crystal cell. In order that the liquid crystal panel can realize normal display, liquid crystal is required to have a function of changing the polarization state of light, that is, the polarization state of light is changed by an optical delay generated by the liquid crystal and thus bright and dark display is realized. Moreover, the function of the liquid crystal of changing the polarization state of light depends on the optical delay $\Delta nd$ (where $\Delta n$ is a difference between the refractivity in a slow axis direction and the refractivity in a fast axis direction of the liquid crystal and d is the thickness of the liquid crystal cell) of the liquid crystal. Ideally, the thickness d of the whole liquid crystal cell should be identical, so that the controllability and uniformity of the display effect are ensured. Therefore, the control of the thickness of the liquid crystal cell is of great importance to the liquid crystal display.

In addition, to meet the demand of market, there are more and more researches on flexible display and flexible display products, and flexible liquid crystal displays are also widely researched and tried. For flexible liquid crystal displays, one of key problems is that it is difficult to ensure the controllability and uniformity of the display effect because the thickness d of a liquid crystal cell is difficult to maintain during deflection.

SUMMARY OF THE INVENTION

The technical problem to be solved by the present invention is, in view of the problem of non-uniform thickness of a liquid crystal cell of an existing flexible display panel, to provide a flexible display panel and a flexible display which can avoid undesirable display due to the non-uniform thickness of a liquid crystal cell.

A technical solution employed to solve the technical problem to be solved by the present invention is a flexible display panel, comprising a first flexible substrate and a second flexible substrate which are cell-aligned to each other. The flexible display panel further comprises a blue phase liquid crystal layer disposed between the first flexible substrate and the second flexible substrate; a reflective layer disposed on the second flexible substrate at a side far away from the blue phase liquid crystal layer, and strip electrodes arranged on the second flexible substrate at a side close to the blue phase liquid crystal layer at intervals; and a ¼ wave plate and a polarizer successively arranged on the first flexible substrate at a side far away from the blue phase liquid crystal layer, with an included angle between a light transmitting axis of the polarizer and an optical axis of the ¼ wave plate being 45° and an included angle between each of the strip electrodes and the optical axis of the ¼ wave plate being 90°.

In the present invention, since a reflective layer is disposed on the second flexible substrate at the side far away from the blue phase liquid crystal layer, the reflective layer may reflect ambient light to a direction where the first flexible substrate is located after the external ambient light irradiates on the reflective layer through the first flexible substrate, the blue phase liquid crystal layer and the second flexible substrate, that is, the external ambient light is equivalent to a backlight source. In this case, if the liquid crystal display panel is applied to a liquid crystal display, a backlight source is not required, so that the production cost of the liquid crystal display is reduced. Meanwhile, the liquid crystal filled between the first flexible substrate and the second flexible substrate is a blue phase liquid crystal layer, wherein the blue phase is a liquid crystal phase between an isotropic state and a cholesteric phase. Since the blue phase liquid crystal has high molecular stability and is in an isotropic state without the action of an electric field, the blue phase liquid crystal applied to a display panel may allow the liquid crystal display panel to have the characteristics of large angle of view, good dark state, and the like. Meanwhile, since the powered-on blue phase liquid crystal has the characteristic of generating birefraction, the liquid crystal display panel does not need an orientation layer (i.e., an alignment film) required for other types of liquid crystal display panels, so that the manufacturing cost is reduced and the manufacturing process is simplified. Moreover, the theoretical response time of a liquid crystal display panel using blue phase liquid crystal may be not more than the millisecond scale, so the response time is greatly improved, and thus it is not required to prepare a color filter layer on the first flexible substrate and the display of different colors is controlled by sequential control. Therefore, in comparison to a common liquid crystal display panel, the liquid crystal display panel using blue phase liquid crystal has a higher contrast, faster response time and a wider angle of view and greatly improves the display quality of the liquid crystal display panel. However, this type of liquid crystal panel has the disadvantages of relatively high required driving voltage and low optical efficiency. However, the photoelectric property of blue phase liquid crystal is non-sensitive to the thickness of the liquid crystal cell, therefore, most importantly, when a flexible display panel is bent, the display effect will not be greatly influenced even though the thickness of the liquid crystal cell is changed, so that the problem of poor display effect of the flexible display panel due to non-uniform thickness of the liquid crystal cell can be solved.

Preferably, the strip electrodes include pixel electrodes and common electrodes, wherein the pixel electrodes and the common electrodes are spaced from each other at equal intervals.

Preferably, plate electrodes are further provided on the second flexible substrate at the side close to the blue phase liquid crystal layer, the strip electrodes are disposed above the plate electrodes and spaced from the plate electrodes through an insulating layer, wherein the plate electrodes are pixel electrodes, and the strip electrodes are common electrodes; or, the plate electrodes are common electrodes, and the strip electrodes are pixel electrodes.

Preferably, a width of each of the strip electrodes ranges from 2 μm to 5 μm, and a space between the strip electrodes ranges from 4 μm to 10 μm.

Preferably, a thickness of a liquid crystal cell formed by the first flexible substrate and the second flexible substrate ranges from 2 μm to 5 μm.

Preferably, the first flexible substrate comprises a first flexible base, and the second flexible substrate comprises a second flexible base, wherein both the first flexible base and the second flexible base are made from any one of polyethylene terephthalate, phthalate, and polyimide.

Further preferably, the first flexible substrate further comprises a color filter layer disposed between the first flexible base and the ¼ wave plate.

Preferably, the reflective layer is made from aluminum or silver.

A technical solution employed to solve the technical problem to be solved by the present invention is a flexible display, comprising the above flexible display panel.

The flexible display provided by the present invention comprises the above flexible display panel, and thus the flexible display may avoid the influences on the display quality due to a non-uniform thickness of a liquid crystal cell and have a low production cost.

Preferably, the flexible display further comprises a front light source disposed on a front frame of the flexible display.

DETAILED DESCRIPTION OF THE EMBODIMENTS

To make those skilled in the art better understand the technical solutions of the present invention, the present invention will be further described as below in detail with reference to the drawings and specific embodiments. Apparently, the embodiments described herein are a part of, but not all of embodiments of the present invention. All other embodiments acquired by a person of ordinary skill in the art based on the described embodiments of the present invention without any creative effort shall fall into the protection scope of the present invention.

Embodiment 1

Figure 1:
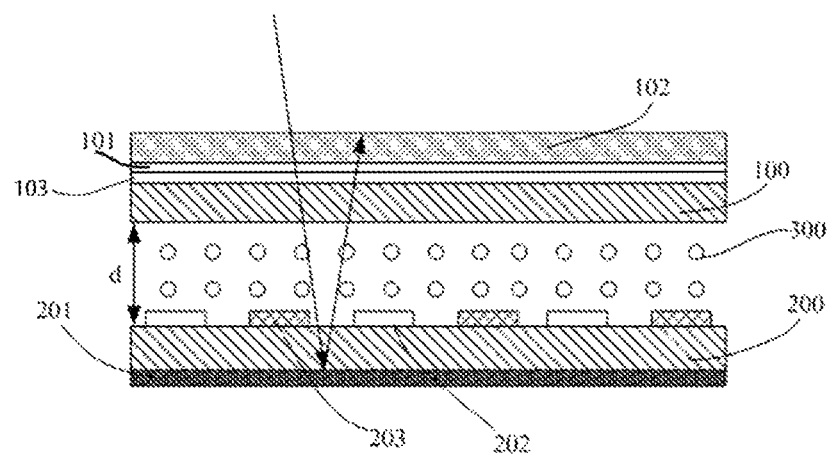
FIG. 1 is a schematic diagram of a flexible display panel according to Embodiment 1 of the present invention when no voltage is applied thereto.
Figure 2:
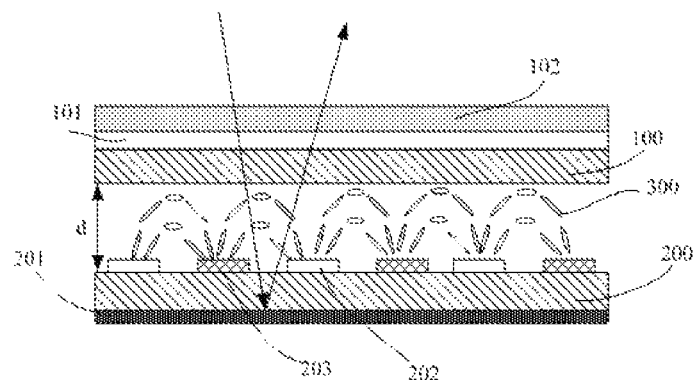
FIG. 2 is a schematic diagram of the flexible display panel according to Embodiment 1 of the present invention when a voltage is applied thereto.

Referring to FIGS. 1 and 2, this embodiment provides a flexible display panel, comprising a first flexible substrate 100 and a second flexible substrate 200 which are cell-aligned to each other, and a blue phase liquid crystal layer 300 disposed between the first flexible substrate 100 and the second flexible substrate 200. The flexible display panel further comprises a reflective layer 201 disposed on the second flexible substrate 200 at a side far away from the blue phase liquid crystal layer 300 and strip electrodes disposed on the second flexible substrate 200 at a side close to the blue phase liquid crystal layer 300 at intervals; and, a ¼ wave plate 101 and a polarizer 102 which are successively arranged on the first flexible substrate 100 at a side far away from the blue phase liquid crystal layer 300, with an included angle between a light transmitting axis of the polarizer 102 and an optical axis of the ¼ wave plate 101 being 45° and an included angle between each of the strip electrodes and the optical axis of the ¼ wave plate 101 being 90°.

In this embodiment, since the reflective layer 201 is disposed on the second flexible substrate 200 at the side far away from the blue phase liquid crystal layer 300, the reflective layer 201 may reflect ambient light to a direction where the first flexible substrate 100 is located after the external ambient light irradiates on the reflective layer 201 through the first flexible substrate 100, the blue phase liquid crystal layer 300 and the second flexible substrate 200, that is, the external ambient light is equivalent to a backlight source. In this case, if the liquid crystal display panel is applied to a liquid crystal display, a backlight source is not required, so that the production cost of the liquid crystal display is reduced. Meanwhile, the liquid crystal filled between the first flexible substrate 100 and the second flexible substrate 200 is blue phase liquid crystal, wherein the blue phase is a liquid crystal phase between an isotropic state and a cholesteric phase. Since the blue phase liquid crystal has high molecular stability and is in an isotropic state without the action of an electric field, the blue phase liquid crystal applied to a display panel may allow the liquid crystal display panel to have the characteristics of large angle of view, good dark state and the like. Meanwhile, since the powered-on blue phase liquid crystal has the characteristic of generating birefraction, the liquid crystal display panel does not need an orientation layer (i.e., an alignment film) required for other types of liquid crystal display panels, so that the manufacturing cost is reduced and the manufacturing process is simplified. Moreover, the theoretical response time of a liquid crystal display panel using blue phase liquid crystal may be not more than the millisecond scale, so the response time is greatly improved, and thus it is not required to prepare a color filter layer on the first flexible substrate 100 and the display of different colors is controlled by sequential control. Therefore, in comparison to a common liquid crystal display panel, the liquid crystal display panel using blue phase liquid crystal has a higher contrast, faster response time and a wider angle of view and greatly improves the display quality of the liquid crystal display panel. However, this type of liquid crystal panel has the disadvantages of relatively high required driving voltage and low optical efficiency. However, the photoelectric property of blue phase liquid crystal is non-sensitive to the thickness of the liquid crystal cell, therefore, most importantly, when a flexible display panel is bent, the display effect will not be greatly influenced even though the thickness of the liquid crystal cell is changed, so that the problem of poor display effect of the flexible display panel due to non-uniform thickness of the liquid crystal cell can be solved.

In this embodiment, since the blue phase liquid crystal layer 300 is used, for the flexible display panel, it is required to form an electrode structure similar to a transverse electric field mode on the second flexible substrate 200. The transverse electric field mode is, for example, but not limited to an IPS (In-Plane Switching) mode or an ADS (Advanced Super Dimension Switch) mode.

Specifically, in this embodiment, preferably, the strip electrodes arranged on the second flexible substrate 200 at the side close to the blue phase liquid crystal layer 300 at intervals include pixel electrodes 202 and common electrodes 203, wherein the pixel electrodes 202 and the common electrodes 203 are spaced from each other at equal intervals and completely identical in shape and size. That is, the strip electrodes are equal in length, in width and in thickness. The electric field mode formed by the electrode structure is an IPS mode. Further, preferably, the width of each of the strip electrodes ranges from 2 µm to 5 µm, and the space between the pixel electrodes 202 and the common electrodes 203 ranges from 4 µm to 10 µm.

Since the pixel electrodes 202 and the common electrodes 203 are completely identical in shape and in size and arranged in a same layer at equal intervals, an electric field formed between the pixel electrodes 202 and the common electrodes 203 is distributed uniformly. If edge effects of the electric field are ignored, it could be considered that the electric field is periodically distributed in an arrangement direction of the strip electrodes.

Of course, in this embodiment, preferably, plate electrodes may be further provided on the second flexible substrate 200 at the side close to the blue phase liquid crystal layer 300, the strip electrodes are disposed above the plate electrodes and spaced from the plate electrodes through an insulating layer, wherein the plate electrodes are pixel electrodes 202, and the strip electrodes are common electrodes 203; or, the strip electrodes are pixel electrodes 202, and the plate electrodes are common electrodes 203. The electric field mode formed by this electrode structure is an ADS mode. The electric fields in the ADS mode are similar to that in the IPS mode, and will not be described in details again.

In this embodiment, to make the flexible display panel lighter and thinner, preferably, the thickness of a liquid crystal cell formed by the first flexible substrate 100 and the second flexible substrate 200 ranges from 2 µm to 5 µm.

In this embodiment, the first flexible substrate 100 comprises a first flexible base, and the second flexible substrate 200 comprises a second flexible base, wherein both the first flexible base and the second flexible base are made from any one of polyethylene terephthalate, phthalate, and polyimide. Of course, the first flexible base and the second flexible base may also be formed from other flexible and high temperature (400° C.) resistant resin materials.

To make the display effect better, in this embodiment, preferably, the first flexible substrate 100 further comprises a color filter layer 103 disposed between the first flexible base and the ¼ wave plate 101.

In this embodiment, the reflective layer 201 disposed on the second flexible substrate 200 at the side far away from the blue phase liquid crystal layer 300 may be made from aluminum or silver, or may be made from other reflective materials.

The working process of the flexible display panel provided in this embodiment will be described as below.

FIG. 1 is a schematic diagram of the reflective flexible display panel in this embodiment when no voltage is applied thereto. When no voltage is applied, the blue phase liquid crystal is in an optical isotropic state, that is, the refractivity in each direction is the same. As shown in FIG. 1, in this case, the refractivity distribution of the blue phase liquid crystal may be equivalent to a circle. In this embodiment, an included angle between a light transmitting axis of the polarizer 102 and an optical axis of the ¼ wave plate 101 is 45°. Herein, it is assumed that the light transmitting axis of the polarizer 102 is at 45°, and the optical axis of the ¼ wave plate 101 is at 0°. In this case, when the external ambient light enters, the light is turned into linearly polarized light at 45° through the polarizer 102, and the linearly polarized light at 45° is changed by 90° in the polarization state after passing through the ¼ wave plate 101 placed at 0° to form left-handed circularly polarized light. The left-handed circularly polarized light has no change in the polarization stage after passing through the isotropic blue phase liquid crystal and then continues to be transmitted to the reflective layer 201. After being reflected by the reflective layer 201, the left-handed circularly polarized light is turned into right-handed circularly polarized light. The right-handed circularly polarized light has no change in the polarization stage after passing through the isotropic blue phase liquid crystal and then continues to be transmitted. After passing through the ¼ wave plate 101 displaced at 0°, the right-handed circularly polarized light is changed by 90° in the polarization state and then turned into linearly polarized light at −45°. This linearly polarized light is orthogonal to the light transmitting axis of the polarizer 102 and thus cannot penetrate through the polarizer 102. In this case, the flexible display panel is in a dark state.

FIG. 2 is a schematic diagram of the flexible display panel provided in this embodiment when a voltage is applied thereto. When a voltage is applied, the blue phase liquid crystal may be equivalently regarded as extended particles, and a long axis of the blue phase liquid crystal is consistent with an electric field direction. Since the included angle between each of the strip electrodes and the ¼ wave plate 101 is 90°, the electric field direction is perpendicular to the direction of each of the strip electrodes, so that the long axis of the blue phase liquid crystal is parallel to the optical axis of the ¼ wave plate 101. In this case, the anisotropy of the blue phase liquid crystal will allow light passing through the blue phase liquid crystal to generate an optical delay according to a birefraction principle (Kerr effect). According to the Kerr effect, $\Delta n = \lambda K E^2$, wherein $\lambda$, is the wavelength of the incident light, K is a Kerr constant ($K=12.68$ nm/V$^2$) and E is the intensity of the electric field, with the value of E being equal to the voltage U between electrodes divided by the thickness d of the liquid crystal cell. In addition, in the case that a certain voltage is applied to the flexible display panel, when light passes through the blue phase liquid crystal and generates a delay of $\Delta n = \lambda/4$, the phase of the light is changed by $\pi/2$, so that the left-handed circularly polarized light will be turned into linearly polarized light. Therefore, in the case that a certain voltage is applied to the flexible display panel, the incident ambient light is turned into linearly polarized light at 45° after passing through the polarizer 102. Then, the linearly polarized light is changed by 90° in the polarization state after passing through the ¼ wave plate 101 placed at 0° and then turned into left-handed circularly polarized light. After passing through the blue phase liquid crystal layer 300 having a long axis at 0° and an optical delay of $\lambda/4$ generated thereby, the left-handed circularly polarized light is turned into linearly polarized light at −45°. After the linearly polarized light at −45° continues to be transmitted to the reflective layer 201 and then reflected by the reflective layer 201, the linearly polarized light is not changed. After passing through the blue phase liquid crystal layer 300 having an optical delay of $\lambda/4$ and the ¼ wave plate 101, the linearly polarized light at −45° is changed by 90° in the polarization state and then turned into linearly polarized light at 45°. The linearly polarized light at 45° can be emitted from the polarizer 102. In this case, the flexible display panel is in a bright state. Hence, it is not hard to see that, by controlling the magnitude of the applied voltage, the magnitude of $\Delta n d$ may be controlled and different gray levels are thus obtained.

It should be noted that, in this embodiment, the working state of the flexible display panel is described by merely taking the light transmitting axis of the polarizer 102 being at 45°, the optical axis of the ¼ wave plate 101 being at 0° and the optical delay of the blue phase liquid crystal being a quarter wavelength as an example; of course, actually, as long as the included angle between the light transmitting axis of the polarizer 102 and the optical axis of the ¼ wave plate 101 is 45°, other examples will not be enumerated.

Embodiment 2

This embodiment provides a flexible display, comprising the flexible display panel described above. The flexible display may be any product or component having a display function, such as a mobile phone, a tablet computer, a TV set, a display, a notebook computer, a digital photo frame, a navigator, or the like.

Preferably, the flexible display provided in this embodiment further comprises a front light source disposed on a front frame of the flexible display. The front light source may allow light to irradiate on the flexible display panel, so that the flexible display may also perform display in a dark environment.

The flexible display provided in this embodiment has the flexible display panel provided in Embodiment 1, so the cost of the flexible display is low.

Of course, the flexible display provided in this embodiment may further comprise other conventional structures, such as a power supply unit, a display driving unit, and the like.

It should be understood that the foregoing embodiments are merely exemplary embodiments used for describing the principle of the present invention, and the present invention is not limited thereto. A person having ordinary skill in the art may make various variations and improvements to the present invention without departing from the spirit and essence of the present invention, and these variations and improvements shall fall into the protection scope of the present invention.

The invention claimed is:

1. A flexible display panel, comprising a first flexible substrate and a second flexible substrate which are cell-aligned to each other, wherein, the flexible display panel further comprises a blue phase liquid crystal layer disposed between the first flexible substrate and the second flexible substrate;
   a reflective layer disposed on the second flexible substrate at a side far away from the blue phase liquid crystal layer, and strip electrodes arranged on the second flexible substrate at a side close to the blue phase liquid crystal layer at intervals; and
   a ¼ wave plate and a polarizer successively arranged on the first flexible substrate at a side far away from the blue phase liquid crystal layer, with an included angle between a light transmitting axis of the polarizer and an optical axis of the ¼ wave plate being 45° and an included angle between each of the strip electrodes and the optical axis of the ¼ wave plate being 90°.

2. The flexible display panel according to claim 1, wherein the strip electrodes comprise pixel electrodes and common electrodes, wherein
   the pixel electrodes and the common electrodes are spaced from each other at equal intervals.

3. The flexible display panel according to claim 2, wherein a width of each of the strip electrodes ranges from 2 μm to 5 μm; and
   a space between the strip electrodes ranges from 4 μm to 10 μm.

4. The flexible display panel according to claim 1, wherein plate electrodes are further provided on the second flexible substrate at the side close to the blue phase liquid crystal layer, the strip electrodes are disposed above the plate electrodes and spaced from the plate electrodes through an insulating layer, wherein
   the plate electrodes are pixel electrodes, and the strip electrodes are common electrodes; or
   the plate electrodes are common electrodes, and the strip electrodes are pixel electrodes.

5. The flexible display panel according to claim 4, wherein a width of each of the strip electrodes ranges from 2 μm to 5 μm; and
   a space between the strip electrodes ranges from 4 μm to 10 μm.

6. The flexible display panel according to claim 1, wherein a width of each of the strip electrodes ranges from 2 μm to 5 μm; and
   a space between the strip electrodes ranges from 4 μm to 10 μm.

7. The flexible display panel according to claim 1, wherein a thickness of a liquid crystal cell formed by the first flexible substrate and the second flexible substrate ranges from 2 μm to 5 μm.

8. The flexible display panel according to claim 1, wherein the first flexible substrate comprises a first flexible base, and the second flexible substrate comprises a second flexible base, wherein
   both the first flexible base and the second flexible base are made from any one of polyethylene terephthalate, phthalate, and polyimide.

9. The flexible display panel according to claim 8, wherein the first flexible substrate further comprises a color filter layer disposed between the first flexible base and the ¼ wave plate.

10. The flexible display panel according to claim 1, wherein the reflective layer is made from aluminum or silver.

11. A flexible display, comprising the flexible display panel according to claim 1.

12. The flexible display according to claim 11, further comprising a front light source disposed on a front frame of the flexible display.

* * * * *